(12) United States Patent
Garratt

(10) Patent No.: US 6,349,498 B1
(45) Date of Patent: Feb. 26, 2002

(54) FISHING LURE

(76) Inventor: Gary Garratt, Box 253, Wawota, Saskatchewan (CA), S0G 5AO ( * ) Notice: Subject to any disclaimer, the term of this patent is extended or adjusted under 35 U.S.C. 154(b) by 0 days.

(21) Appl. No.: 09/347,264

(22) Filed: Jul. 6, 1999

(51) Int. Cl.[7] ............................................. A01K 85/00
(52) U.S. Cl. ................................................... 43/42.06
(58) Field of Search ............................ 43/42.06, 42.02, 43/42.23, 42.52, 42.03, 42.35, 42.5, 42.08

(56) References Cited

U.S. PATENT DOCUMENTS

| | | | | |
|---|---|---|---|---|
| 839,917 A | | 1/1907 | Chapman | 43/42.06 |
| 2,239,802 A | * | 4/1941 | Westby | 43/42.23 |
| 2,632,276 A | * | 3/1953 | Hale | 43/42.06 |
| 2,739,405 A | * | 3/1956 | Martin | 43/42.06 |
| 2,819,552 A | * | 1/1958 | Russell, Jr. | 43/42.23 |
| 2,833,071 A | | 5/1958 | Benoit | 43/42.06 |
| 2,833,077 A | * | 5/1958 | Benoit | 43/42.06 |
| 2,834,141 A | * | 5/1958 | Quyle | 43/42.06 |
| 2,982,048 A | | 5/1961 | McGarry et al. | 43/42.06 |
| 3,040,468 A | * | 6/1962 | Knapton | 43/42.23 |
| 3,403,469 A | | 10/1968 | Whitney | 43/42.06 |
| 3,896,580 A | * | 7/1975 | William, Jr. | 42/42.31 |
| 3,898,757 A | | 8/1975 | Gentert | 43/42.06 |
| 4,881,340 A | * | 11/1989 | Davis | 43/42.06 |
| 4,914,849 A | * | 4/1990 | Hook | 43/42.08 |

* cited by examiner

*Primary Examiner*—Kurt Rowan
(74) *Attorney, Agent, or Firm*—Oyen Wiggs Green & Mutala

(57) ABSTRACT

A fishing lure capable of effective use in both casting/trolling and jigging. The fishing lure has connection sites for connecting a fishing line or a hook not only at each of its ends, but also at a location between its ends (preferably, at its top center). Where the lure is used for jigging, the fishing line is connected at the top center connection site and the hook(s) can be connected at either the bottom center connection site or the two end connection sites. By incorporating into the lure different sites along the lure at which lines can be connected to the lure, the lure is adaptable for use in different types of fishing. In addition to this adaptability, the main body of the lure can be selected so as to cause the lure to exhibit desirable patterns of movement through water in order to attract more fish.

16 Claims, 11 Drawing Sheets

FISHING LURE

TECHNICAL FIELD

This invention relates to a lure for fishing.

BACKGROUND

There are many different types of fishing lures in the marketplace today, with varying ranges of effectiveness in attracting fish. In general, a fishing lure is intended to simulate the movements, and, to some extent, the appearance of a live water creature on which the fish to be attracted might feed. Accordingly, most lures are provided with highly noticeable surfaces and are constructed so as to have considerable motion as they move through the water while trolling, casting, or jigging. Usually these motions are relative simple, such as a weaving or spinning motion. For example, U.S. Pat. No. 2,982,048 issued May 2, 1961 to McGarry et al. and U.S. Pat. No. 3,403,469 issued Oct. 1, 1968 to Whitney disclose casting/trolling fishing lures composed of two concave, twisted strips joined together, each lure having a side-to-side weaving motion when drawn through water due to the flow of water through the opening between the two strips and along the curves and twists of those strips. U.S. Pat. No. 3,898,757 issued Aug. 12, 1975 to Gentert, U.S. Pat. No. 839,917 issued Jan. 1, 1907 to Chapman, and U.S. Pat. No. 2,833,071 issued May 6, 1958 to Benoit disclose casting/trolling lures with similar configurations, although with spinning motions when drawn through water.

Most lures perform only the single function for which they are designed. Some lures (like those in the patents described above) are suitable only for casting and trolling, while others are suitable only for jigging. Since both casting and trolling involve pulling a lure horizontally through water, the fishing line, during casting or trolling, will be connected to a ring or eyelet in the forward end of the casting/trolling lure body to allow the lure to be pulled in such a way that the lure simulates the natural movement of a live water creature. However, such lure configurations do not work well for jigging, which involves jerky up-and-down vertical movements through the water. Using a casting/trolling lure with a line connected to its forward end for jigging will cause the lure to hang vertically in the water, giving an unnatural appearance and making it difficult to attract fish. Similarly, jigging lures do not work well for casting or trolling since they are configured for a different purpose.

Some lures purport to be able to function as both casting lures and as jigging lures. However, they do not perform well for a number of reasons—they tend to be heavy and cumbersome, their designs are not adequate to provide natural appearances and motions in both casting/trolling and jigging contexts, and they provide only a single means of line connection (which will not be suitable for both casting and jigging).

It would be convenient for fishers if there were a lure design that successfully encompassed both methods of fishing in one lure and, at the same time, provided extraordinary motion through water so as to attract fish.

SUMMARY OF INVENTION

A fishing lure according to the present invention is capable of effective use in both casting/trolling and jigging. The fishing lure has connection sites for connecting a fishing line or a hook not only at each end of the lure, but also at a location between its two ends (preferably, at its top center). Where the lure is used for jigging, the fishing line is connected at the top center connection site and the hook(s) can be connected at either the bottom center connection site or the two end connection sites. By incorporating into the lure different sites along the lure at which lines can be connected to the lure, the lure is adaptable for use in different types of fishing.

In addition, the main body of the lure can be selected so as to cause the lure to exhibit desirable patterns of movement through water in order to attract more fish. In an embodiment of the invention described below, the main body of the lure has a fluted lenticular configuration which causes the lure to move in a spectacular spiralling corkscrew pattern through the water when the lure is pulled horizontally through water during casting or trolling. However, during jigging, the same lure will move back and forth in an unusual series of arcs as it is pulled vertically upward. In either case, when allowed to free fall, the lure darts and flutters, realistically simulating live prey.

BRIEF DESCRIPTION OF DRAWINGS

In drawings which illustrate specific embodiments of the invention, but which should not be construed as restricting the spirit or scope of the invention in any way.

DESCRIPTION

Referring to FIGS. 1 through 28, a fishing lure 2 according to the present invention is a multi-purpose lure suitable and adaptable for both casting/trolling and jigging. The lure 2 comprises a main body 10 with connection sites for connecting a fishing line or a hook to the main body 10 not only at the ends of the main body 10 but at a location between the ends (preferably, at its top center). By incorporating into the lure 2 different sites along the main body 10 for connecting a line, the lure 2 becomes adaptable for effective use in both casting/trolling and jigging.

Figure 1:
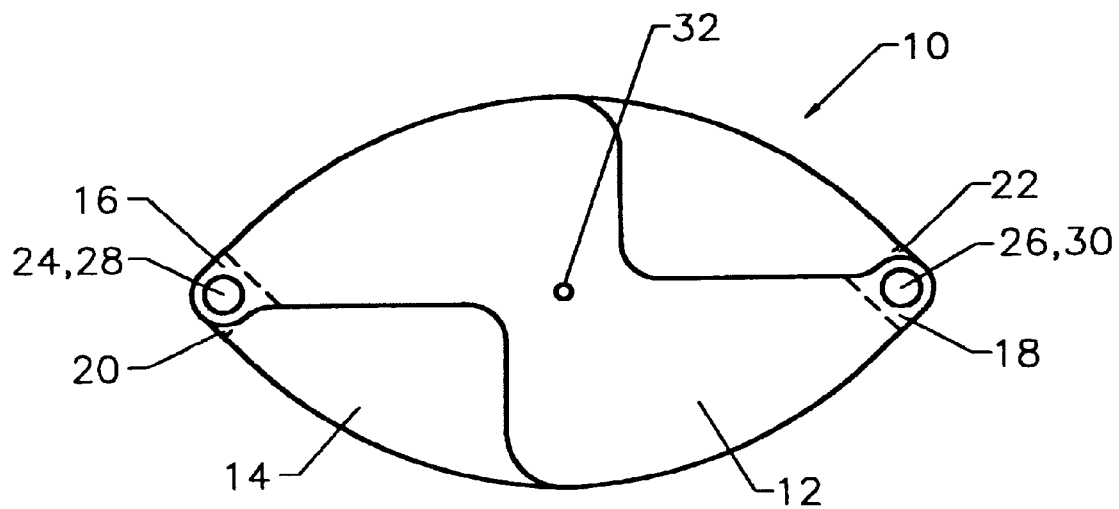
FIG. 1 illustrates a plan view of the main body of a multi-purpose fishing lure, said body comprising an assembly of a top flute and a bottom flute, according to one embodiment of the present invention.
Figure 2:
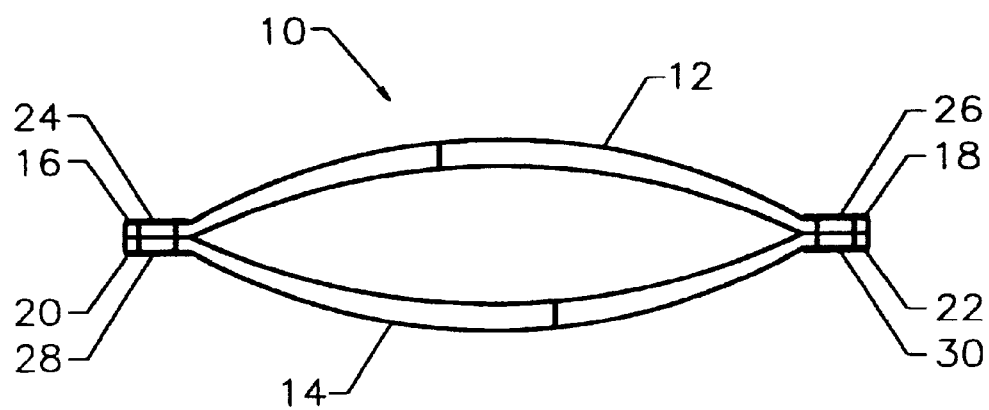
FIG. 2 illustrates a side elevation view of the main body of FIG. 1.

Referring to FIGS. 1 and 2, the lure 2 according to one embodiment of the invention has a fluted lenticular main body 10 composed of two arcuate or concave reverse-offset flutes 12, 14 of preferably identical proportions, preferably made of light gauge metal approximately 3.5 inches (9 cm.) in length and 2 inches (5 cm.) in width. While the top flute 12 and bottom flute 14 are substantially arcuate or concave, the ends 16, 18 of top flute 12 and the ends 20, 22 of bottom flute 14 are flattened so as to be in horizontal alignment with one another. In this embodiment, each flattened end 16, 18, 20, 22, has an aperture 24, 26, 28, 30 through its center (suitable for connecting a fishing line, either directly or by means of a connector), along the longitudinal axis of flutes 12 and 14. Each of apertures 24, 26, 28, 30 preferably has a diameter about ⅛ inch (3 mm.). In the embodiment of the main body 10 shown in FIGS. 1 and 2, top flute 12 is identical to bottom flute 14, except that top flute 12 has an aperture 32 at its center suitable for connecting a line or for affixing a line connector thereto. Aperture 32 preferably has a diameter of about 3/32 inch (2.5 mm.).

Figure 3:
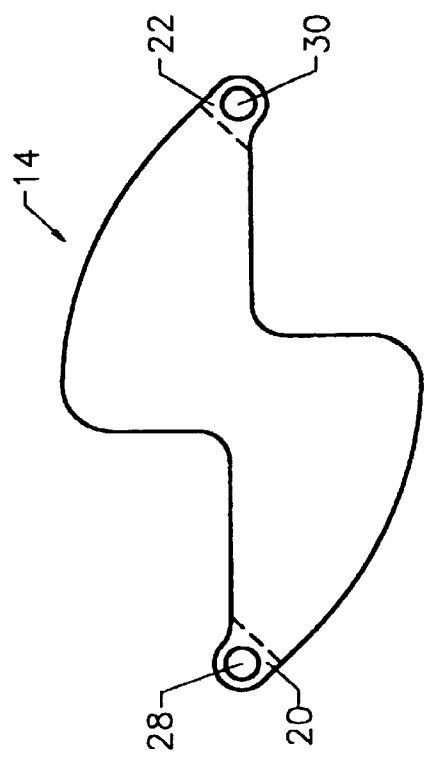
FIG. 3 illustrates a plan view of the top flute of the main body of FIG. 1, prior to assembly with the bottom flute.
Figure 5:
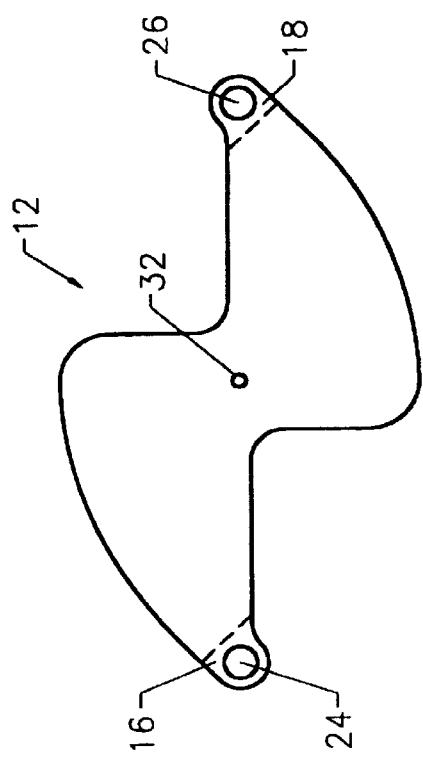
FIG. 5 illustrates a plan view of the bottom flute of the main body of FIG. 1, prior to assembly with the top flute.
Figure 4:
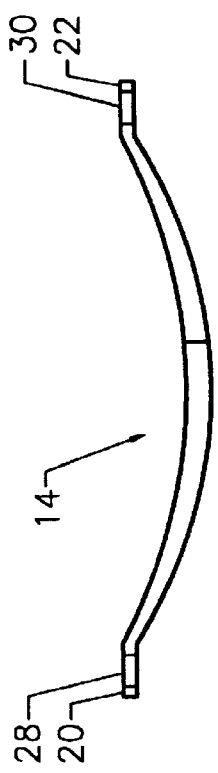
FIG. 4 illustrates a side elevation view of the top flute of FIG. 3.
Figure 6:
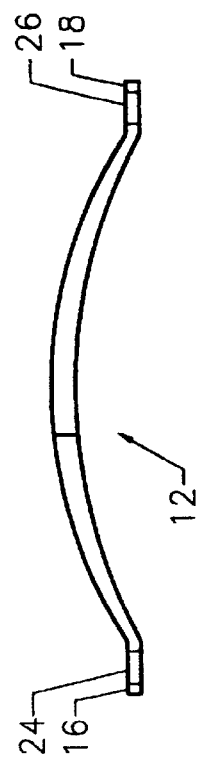
FIG. 6 illustrates a side elevation view of the bottom flute of FIG. 5.

FIGS. 3 through 6 show the disassembled flutes 12, 14 of the main body 10 according to the embodiment of the invention shown in FIGS. 1 and 2. To assemble the main body 10, the bottom flute 14 shown in FIGS. 5 and 6 is positioned with the inside curve facing upwards, and the top flute 12 shown in FIGS. 3 and 4 is positioned with the inside curve facing downwards exactly on top of bottom flute 14 so that flattened end 16 is largely in contact with flattened end 20 and flattened end 18 is largely in contact with flattened end 22, and so that aperture 24 is in vertical alignment with aperture 28 and aperture 26 is in vertical alignment with aperture 30. Top flute 12 is then attached to bottom flute 14, by welding or otherwise, at flattened ends 22, 24, 26, 28 respectively to form a unitary main body 10.

Figure 7:
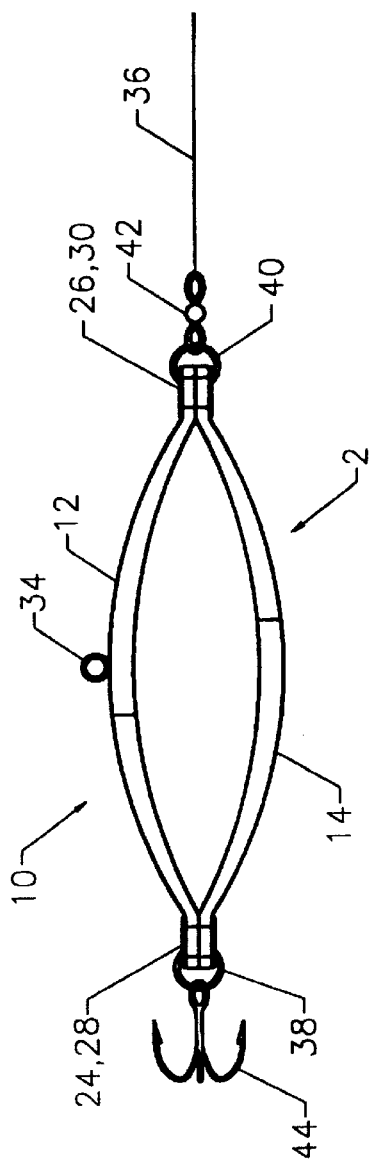
FIG. 7 illustrates a side elevation view of a fishing lure incorporating the main body of FIG. 1, rigged for casting or trolling.
Figure 8:
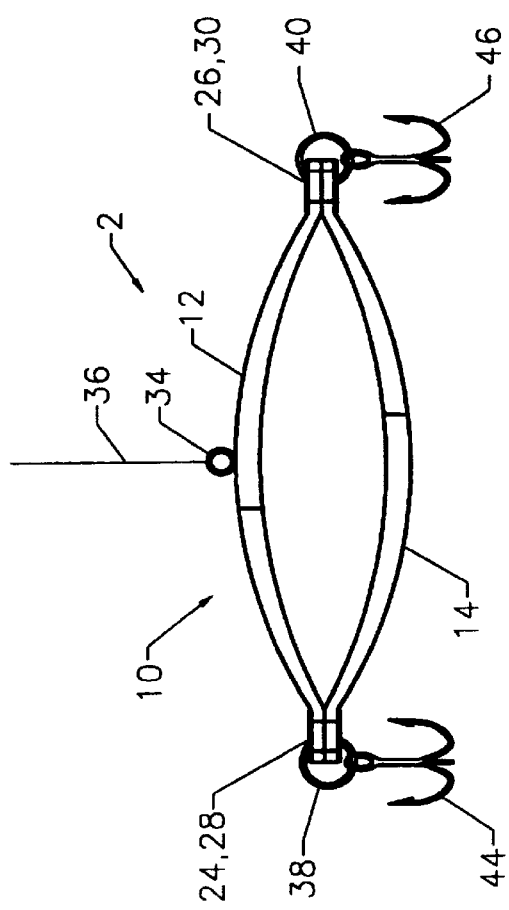
FIG. 8 illustrates a side elevation view of a fishing lure incorporating the main body of FIG. 1, rigged for jigging.
Figure 8A:
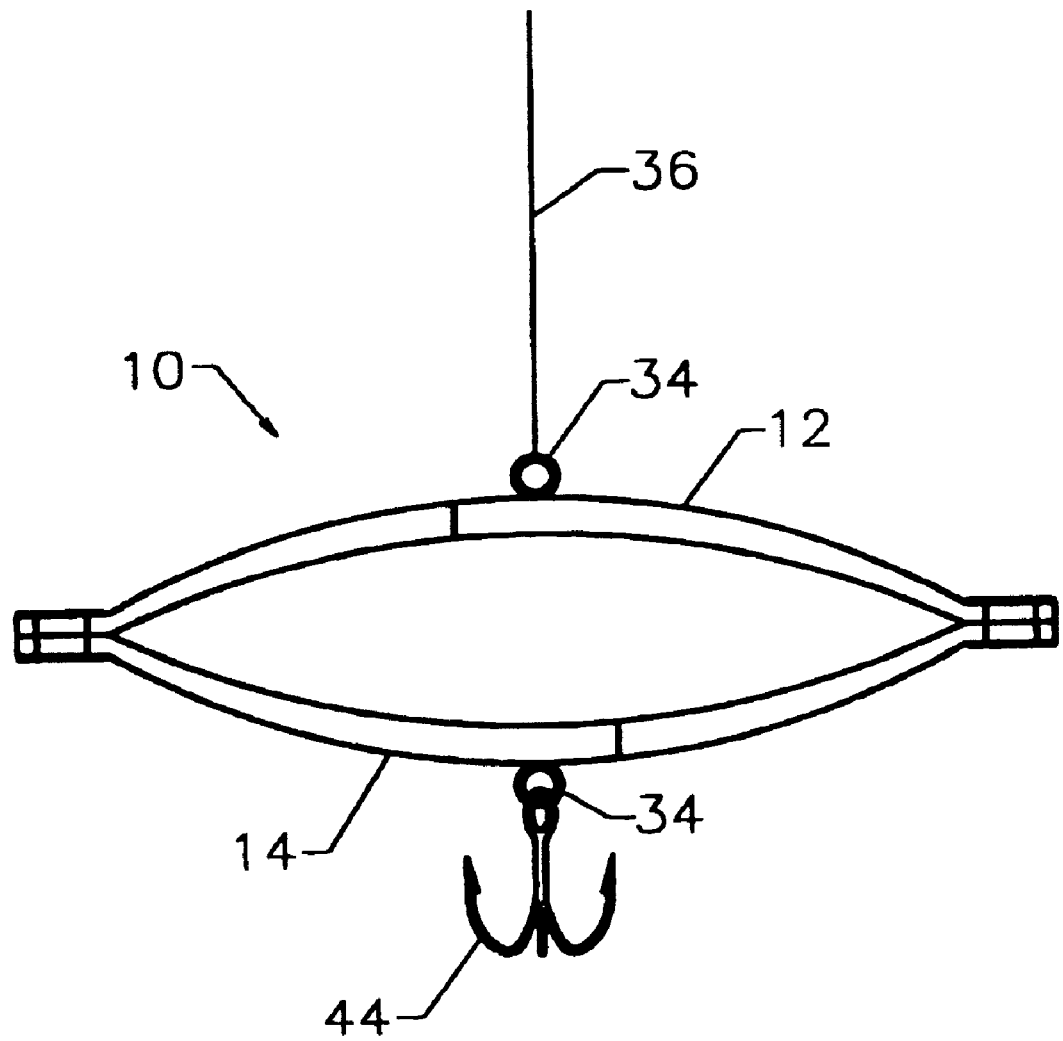
FIG. 8(a) illustrates a side elevation view of an alternative embodiment of the fishing lure of FIG. 8.

A fishing line 36 can not only be connected directly to an aperture at a connection site, but, perhaps even more effectively, can be connected to the main body 10 by means of a connector. As shown in FIGS. 7 and 8 and 8(a), by way of example, a connector such as an eyelet 34 with a short stem can be fastened to top flute 12 at aperture 32, by welding, by punching eyelet 34 directly into main body 10, or otherwise. Of course, any other connector capable of connecting a fishing line 36 to the main body 10 can be used instead of eyelet 34. Also shown in FIGS. 7 and 8, by way of example, connectors can take the form of split rings 38, 40 connected through each aperture 24, 28 and 26, 30 respectively for the purpose of connecting hooks, swivels, or fishing line 36 thereto. In the present example depicted in FIGS. 7 and 8, having both the eyelet 34 in the top center of the main body 10 and split rings 38, 40 at each end of the main body 10 allows a different method of line connection to be used depending on how the main body 10 is intended to be used—that is, whether for casting/trolling or for jigging. In this way, lure 2 can be effectively used for both casting/trolling and for jigging.

FIG. 7 shows the lure 2 ready for use in casting or trolling. In this example, fishing line 36 is connected to the main body 10 by means of a swivel 42 axially rotatably connected to split ring 40 (to reduce line twist), and a treble hook 44 is connected to the main body by means of split ring 38. Eyelet 34 is not used during casting or trolling, but eyelet 34 in no way affects the performance of the lure 2 during casting/trolling.

FIG. 8 shows the lure 2 ready for use in jigging. Fishing line 36 is connected to the main body 10 by means of eyelet 34. Similar to the casting/trolling configuration, a treble hook 44 is connected to split ring 38. However, instead of a swivel 42 being connected to split ring 40, a second treble hook 46 is connected. Rigged in this manner and left to sit still in the water, the main body 10 will suspend itself horizontally in the water, simulating live prey. This is preferable to other types of jigging lures having the fishing line 36 connected to its front end; those lures hang vertically in the water, giving a unnatural appearance and making it difficult to attract and hook fish.

FIG. 8(a) shows an alternative embodiment of the lure 2 as used for jigging. Similar to FIG. 8, fishing line 36 is connected to the top center of the main body 10 by means of eyelet 34. However, as illustrated in FIG. 8(a), the hook connection may be at a single bottom center eyelet 34 (or any other capable connector), rather than on the ends of main body 10. Thus, in FIG. 8(a), treble hook 44 is connected to main body by eyelet 34, found at the bottom center of main body 10, and split rings 38, 40 are not present. The connection of eyelet 34 to the bottom center of main body 10 can be achieved as described above in relation to eyelet 34 at the top center of main body 10. Similarly, an aperture at the bottom center location (not shown) akin to aperture 32 at the top center location may be present.

It will be appreciated that the embodiments of FIGS. 8 and 8(a) could also be combined so that hooks would be connected at the bottom center location (as in FIG. 8(a)) and at both ends of main body 10 (as in FIG. 8) without departing from the inventive scope herein.

Figure 9:
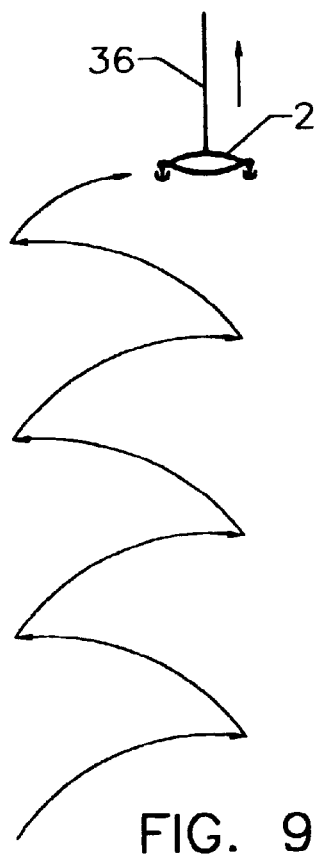
FIG. 9 illustrates a schematic side view of the motion through water, during jigging, of the fishing lure of FIG. 8.

When the lure 2 is used in jigging, it will be subjected to jerky up-and-down movements through the water. As shown in FIG. 9, when subjected to an upward movement, the lure 2 will move back and forth in an unusual series of arcs parallel to the longitudinal axis of the main body 10. On the descent, the lure 2 darts and flutters helplessly from side to side, realistically simulating injured prey. By doing so, the lure 2 is more effective in attracting fish than other jigging lures which hang vertically in the water and have unnatural motions through the water.

Figure 10:
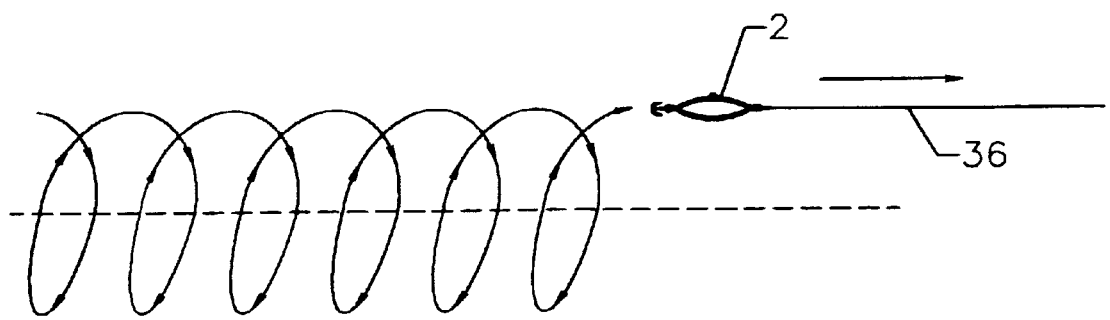
FIG. 10 illustrates a schematic side view of the motion through water, during retrieval (casting) or trolling, of the fishing lure of FIG. 7.
Figure 11:
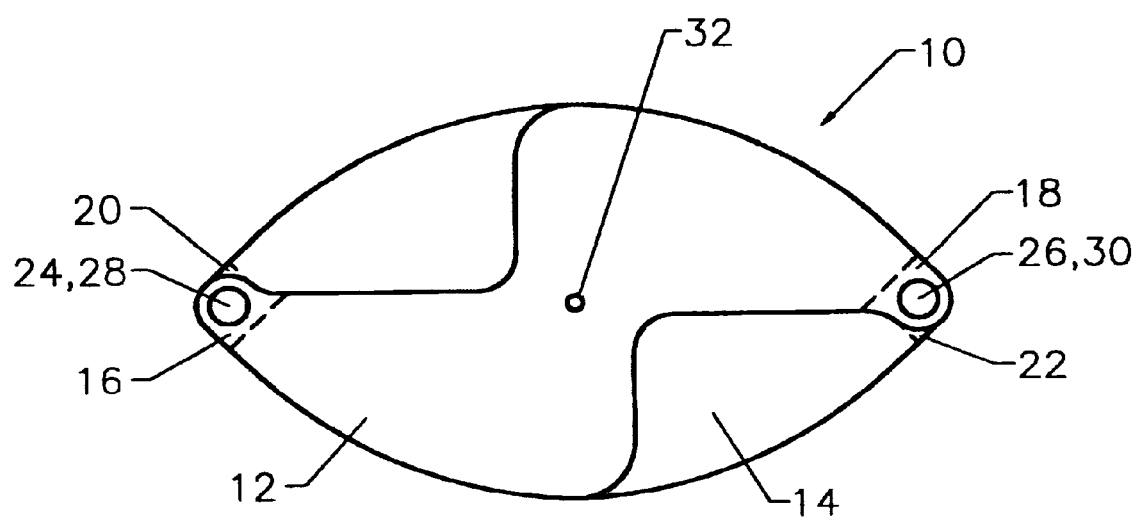
FIG. 11 illustrates a plan view of the main body of a multi-purpose fishing lure, said body comprising a top flute and a bottom flute, according to a second embodiment of the present invention.
Figure 12:
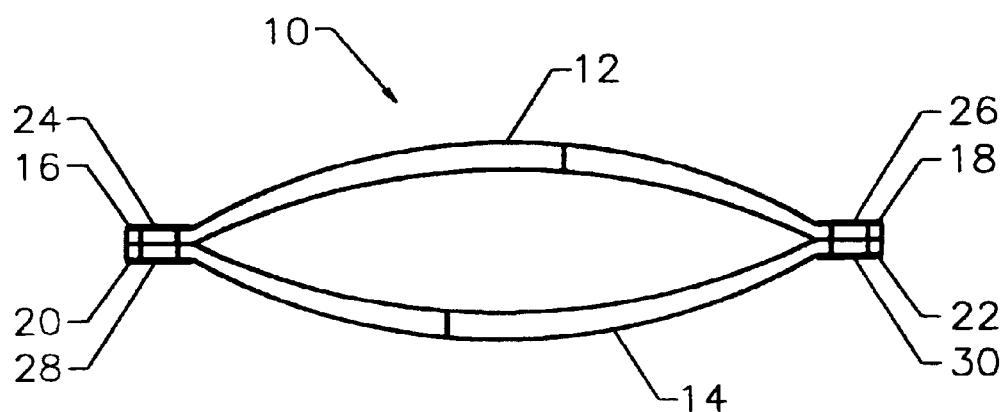
FIG. 12 illustrates a side elevation view of the main body of FIG. 11.
Figure 13:
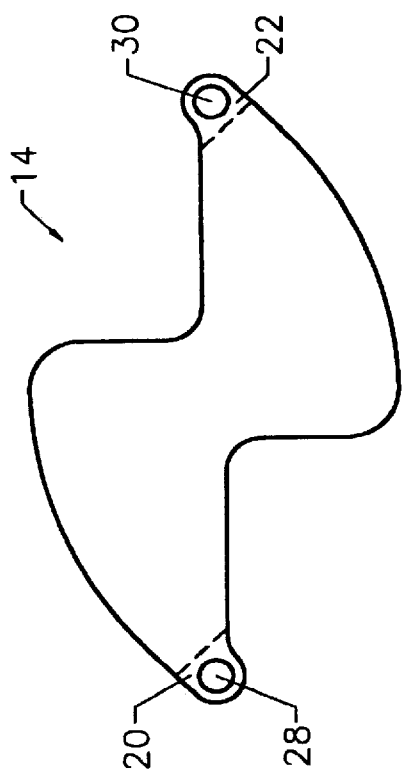
FIG. 13 illustrates a plan view of the top flute of the main body of FIG. 11, prior to assembly with the bottom flute.
Figure 14:
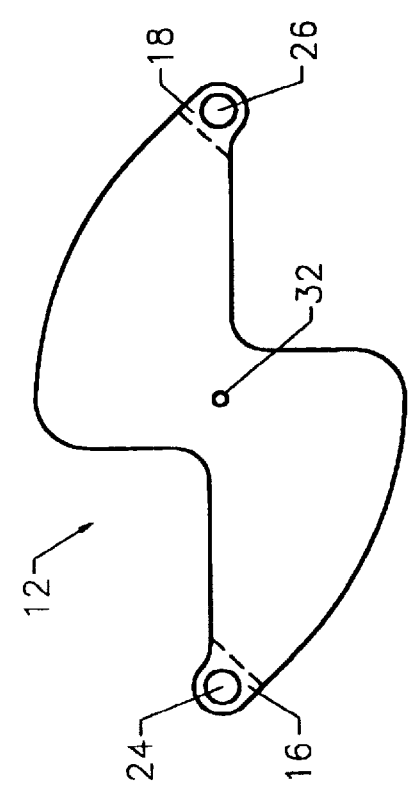
FIG. 14 illustrates a side elevation view of the top flute of FIG. 13.
Figure 15:
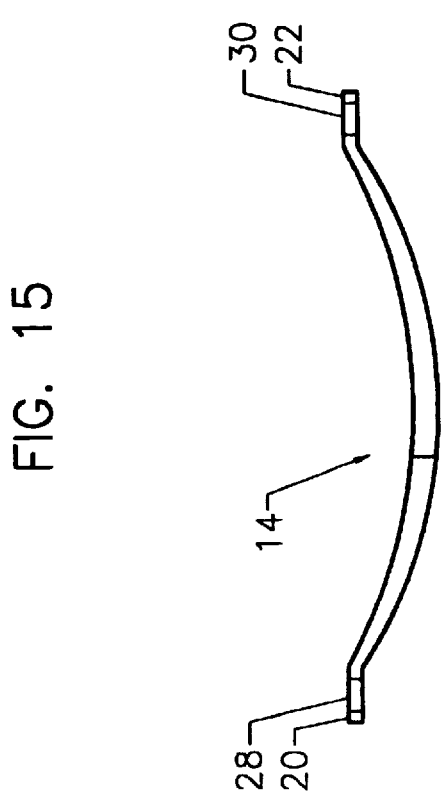
FIG. 15 illustrates a plan view of the bottom flute of the main body of FIG. 11, prior to assembly with the top flute.
Figure 16:
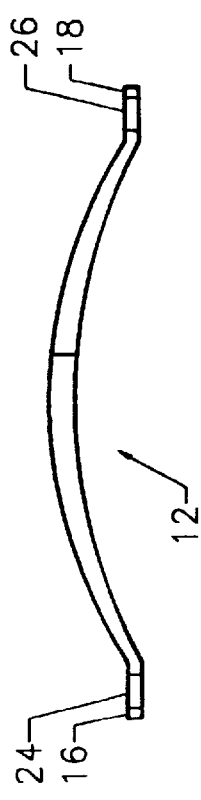
FIG. 16 illustrates a side elevation view of the bottom flute of FIG. 15.
Figure 17:
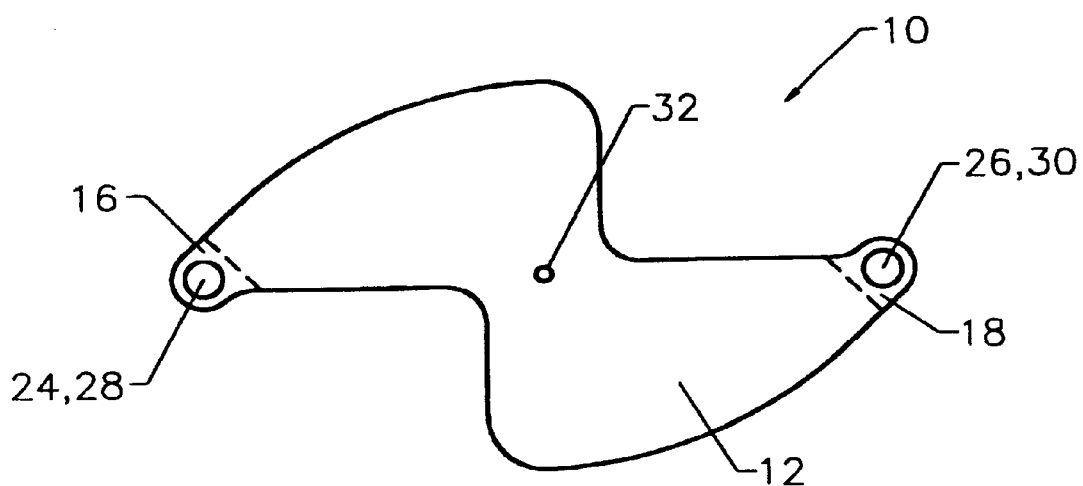
FIG. 17 illustrates a plan view of the main body of a multi-purpose fishing lure, said body comprising a top flute and a bottom flute, according to a third embodiment of the present invention.
Figure 18:
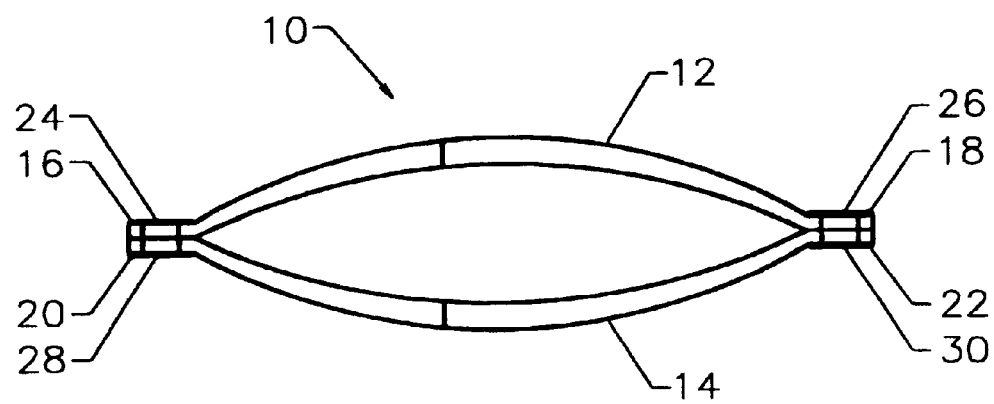
FIG. 18 illustrates a side elevation view of the main body of FIG. 17.
Figure 21:
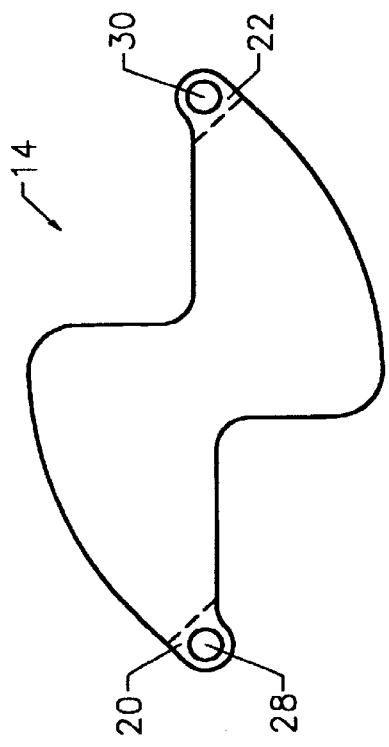
FIG. 21 illustrates a plan view of the bottom flute of the main body of FIG. 17, prior to assembly with the top flute.
Figure 22:
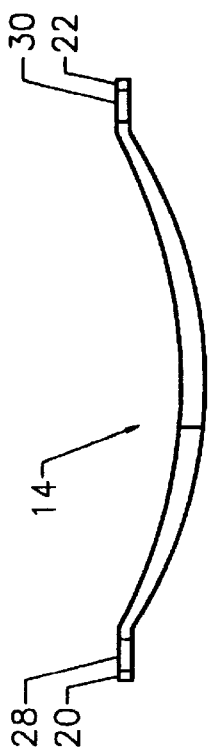
FIG. 22 illustrates a side elevation view of the bottom flute of FIG. 21.
Figure 19:
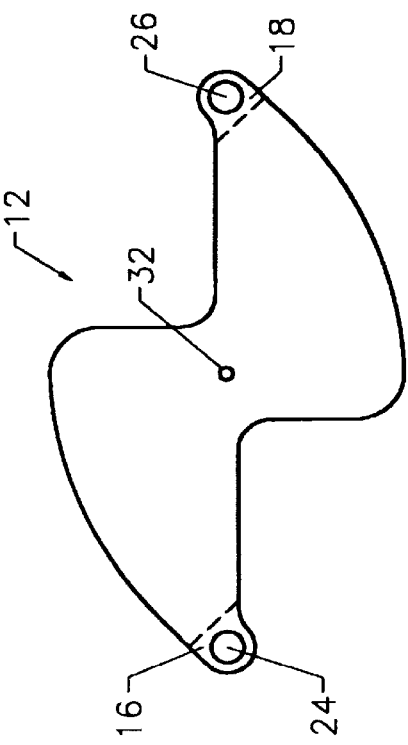
FIG. 19 illustrates a plan view of the top flute of the main body of FIG. 17, prior to assembly with the bottom flute.
Figure 20:
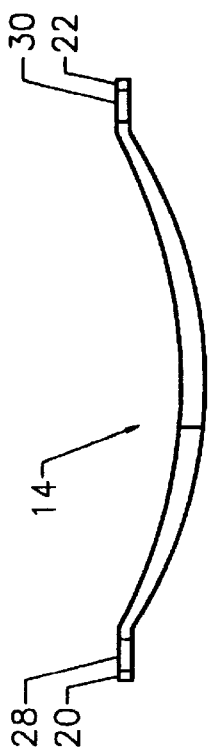
FIG. 20 illustrates a side elevation view of the top flute of FIG. 19.
Figure 23:
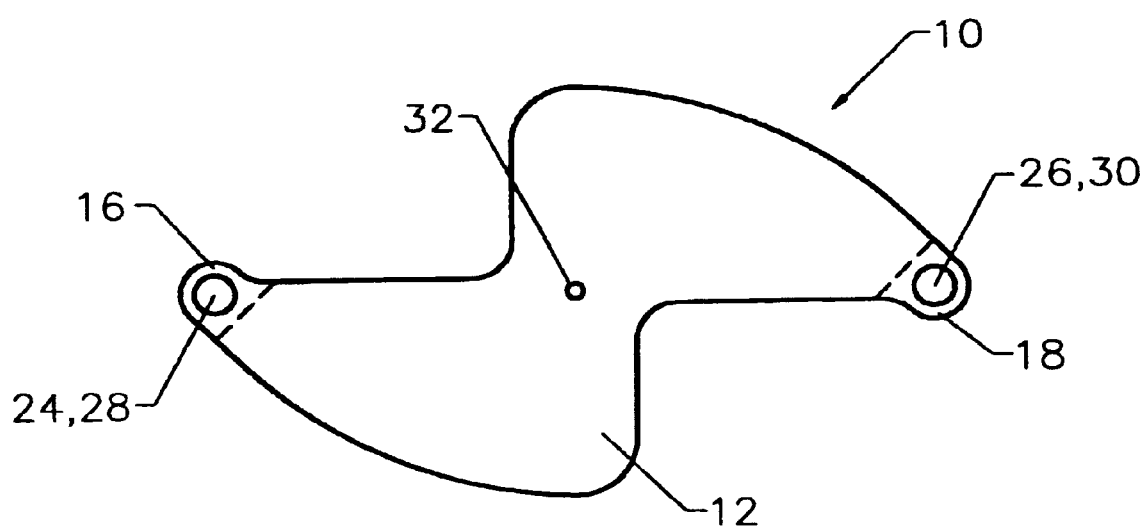
FIG. 23 illustrates a plan view of the main body of a multi-purpose fishing lure, said body comprising a top flute and a bottom flute, according to a fourth embodiment of the present invention.
Figure 24:
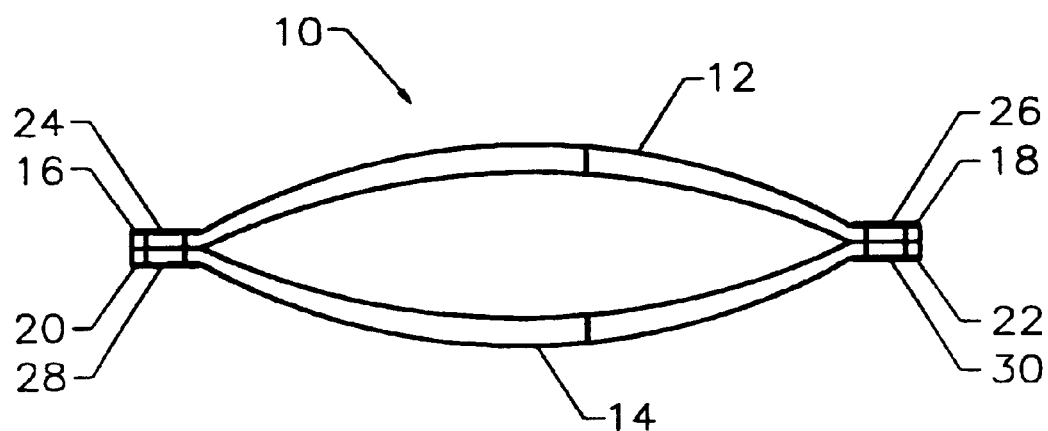
FIG. 24 illustrates a side elevation view of the main body of FIG. 23.
Figure 27:
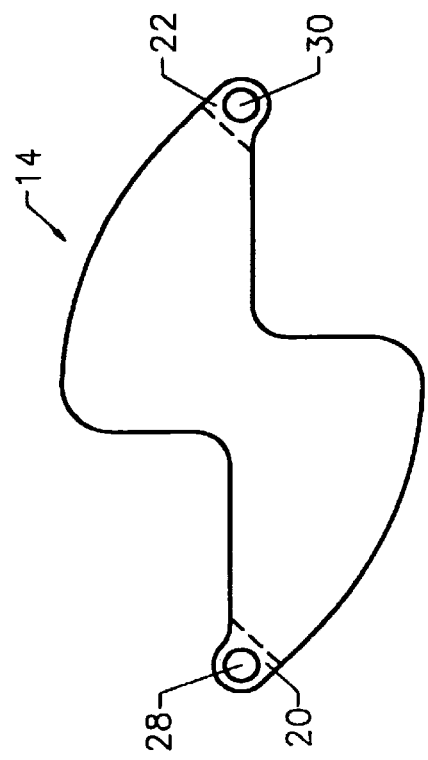
FIG. 27 illustrates a plan view of the bottom flute of the main body of FIG. 23, prior to assembly with the top flute.
Figure 28:
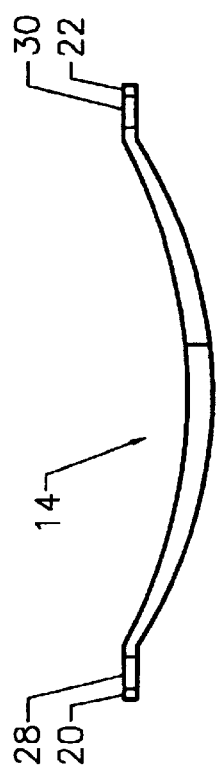
FIG. 28 illustrates a side elevation view of the bottom flute of FIG. 27.
Figure 25:
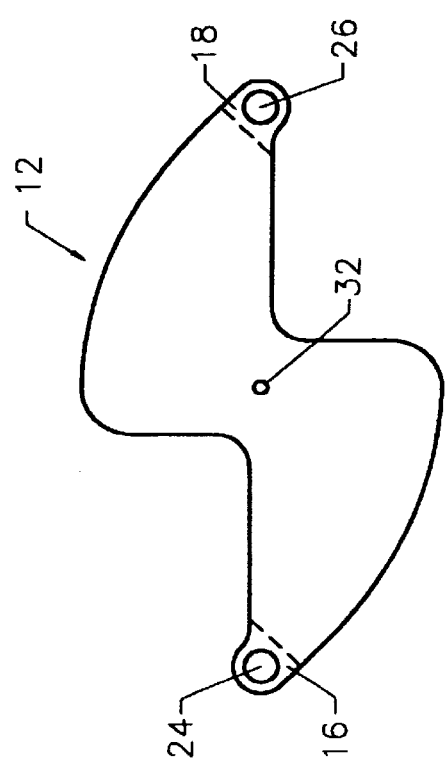
FIG. 25 illustrates a plan view of the top flute of the main body of FIG. 23, prior to assembly with the bottom flute.
Figure 26:
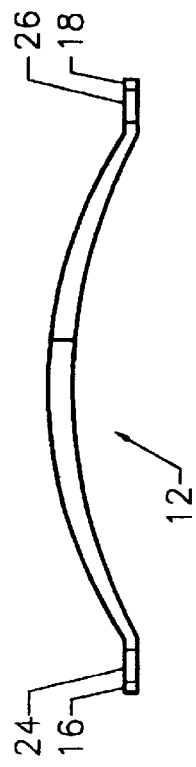
FIG. 26 illustrates a side elevation view of the top flute of FIG. 25.

By way of comparison and contrast, using the method of line connection intended for casting/trolling illustrated in FIG. 7 will cause the lure 2 to exhibit a completely different type of motion through the water. As shown in FIG. 10, during casting or trolling, the lure 2 will travel through the water in a wide corkscrew pattern. Where the main body 10 is approximately 3.5 inches (9 cm.) in length and 2 inches (5 cm.) in width, the corkscrew pattern will have a radius of approximately 3 inches (7.5 cm.) from the axis of the line of travel, creating a spiral of about 6 inches (15 cm.) in diameter, creating an extraordinary motion likely to attract fish.

It will also be appreciated that while the embodiments of the lure having a top center-line connection (FIGS. 8, 8(a)) are preferably used for jigging, they may also be used for casting/trolling.

As discussed, conventional lures typically rotate or wobble along the axis of the line of travel upon retrieval, depending on the speed of retrieval. However, the lure 2 according to this embodiment of the present invention maintains its ability to spiral even at reasonably slow retrieval speeds. There are a number of retrieval techniques used with all lures to give them more action and variety of movement; for example, one method is the "jerk and stop" method. The lure 2 according to this embodiment of the present invention provides spectacular action with any retrieval technique, due to the fluted design of the main body 10 and the increased surface area of the double flutes 12, 14 allowing water to pass between them, creating an uneven flow of water from front to back, which provides the spiralling sideways action upon retrieval and the fluttering and darting action when allowed to free fall.

A lure 2 according to this embodiment of the present invention also has the added advantage of being able to display the outside colors of flute 12 while, at the same time, displaying the inside colors of flute 14, and vice-versa, creating additional appeal.

As with all rotating lures, line twist can be a problem with prolonged use of the lure 2 even when a swivel 42 is used. This invention can address that problem by designing one set of lures 2 to have a clockwise spiralling action and another set of lures 2 to have a counterclockwise spiralling action. This can be achieved by simply creating a second embodiment of the main body 10 in which the patterns of flutes 12 and 14 are reversed, as illustrated in FIGS. 11 through 16. FIGS. 1 through 8 illustrate the main body 10 of a lure 2 having a counterclockwise spiralling pattern, while FIGS. 11 through 18 illustrates the main body 10 of a lure 2 having a clockwise spiralling pattern. In all other respects, the embodiment of the invention illustrated in FIGS. 11 through 16 corresponds exactly with the embodiment of the invention illustrated in FIGS. 1 through 8.

When line twist becomes evident, the user can simply change the lure 2 being used for one that spirals in the opposite direction, and the line twist will be effectively removed. This will be a great boon for fishers as they can continue fishing while removing line twist, rather than making line twist removal a separate, timeconsuming operation, or, in some cases, having to replace the line altogether.

FIGS. 17 through 22 illustrate a main body 10 according to a third embodiment of the invention. In the third embodiment, a top flute 12 having a counterclockwise spiralling effect during retrieval (casting) or trolling is assembled with a bottom flute 14 having a clockwise spiralling effect. This results in a lure 2 having a different pattern of motion through the water than the first two embodiments described above. Even so, a lure 2 incorporating a main body 10 as shown in FIGS. 17 through 22 still has the ability to be adaptably used in both casting/trolling and jigging.

Similarly, FIGS. 23 through 28 illustrate a main body 10 according to a fourth embodiment of the invention, in which a top flute 12 having a clockwise spiralling effect during retrieval (casting) or trolling is assembled with a bottom flute 14 having a counterclockwise spiralling effect.

It is not essential that the main body 10 be in one of the particular embodiments illustrated in FIGS. 1 through 28, although each of the embodiments of the main body 10 shown in FIGS. 1 through 28 has its own advantages, depending on what pattern of movement through the water is desired by the user of the lure 2. In fact, the main body 10, if desired, can comprise simply the top flute 12 as illustrated in any of FIGS. 3 and 4, 13 and 14, 19 and 20, or 25 and 26, without the need for a bottom flute 14. This single-fluted main body 10 constitutes a fifth embodiment of a fishing lure according to the present invention. As will be clear to a person skilled in the art, the number of embodiments exhibiting the adaptability of a fishing lure according to the present invention is limitless.

For example, although FIGS. 1 through 28 illustrate lures 2 having main bodies 10 comprising arcuate or concave flutes 12, 14 having an "S" or reverse "S" pattern, it will be obvious to those skilled in the art that other configurations may be used to achieve the same effect without necessarily using such a pattern. However, it is essential that a lure 2 according to the present invention incorporate some means by which a fishing line may be connected not only to the ends of the main body 10, but also to other locations on the main body 10, so that the lure 2 can be adaptably used for any type of fishing.

Also, as will be apparent to those skilled in the art in the light of the foregoing disclosure, many other alterations and modifications are possible in the practice of this invention without departing from the spirit or scope thereof. Accordingly, the scope of the invention is to be construed in accordance with the substance defined by the following claims.

What is claimed is:

1. A fishing lure comprising:
   a main body having two ends and a generally fluted lenticular shape, and comprising a first flute and a second flute, each of said first and second flutes having a generally arcuate or concave shape and affixed to each other at their respective first and second ends,
   a first connection site at the first end of said main body for connecting a fishing line or a hook to said main body,
   a second connection site at the second end of said main body for connecting a fishing line or a hook to said main body, and a third connection site between the first end and the second end of said main body for connecting a fishing line to said main body.

2. A fishing lure as claimed in claim 1 wherein said main body has an aperture at each of said first and second connection sites for connecting a fishing line or a hook to said main body.

3. A fishing lure as claimed in claim 1 further comprising, at each of said first and second connection sites, a connector for connecting a fishing line or a hook to said main body.

4. A fishing lure as claimed in claim 3 wherein each of said connectors is a split ring connected to said main body through an aperture in said main body at each of said first and second connection sites.

5. A fishing lure as claimed in claim 1 wherein said main body has an aperture at said third connection site for connecting a fishing line to said main body.

6. A fishing lure as claimed in claim 1 further comprising, at said third connection site, a connector for connecting a fishing line to said main body.

7. A fishing lure as claimed in claim 6 wherein said connector is an eyelet connected to said main body at said third connection site.

8. A fishing lure as claimed in claim 1 wherein said third connection site at the top center of said main body.

9. A fishing lure as claimed in claim 8 further comprising a fourth connection site at the bottom center of the main body for connecting a hook to said main body.

10. A fishing lure as claimed in claim 9 wherein said main body has an aperture at said fourth connection site for connecting a hook to said main body.

11. A fishing lure as claimed in claim 9 further comprising, at said fourth connection site, a connector for connecting a hook to said main body.

12. A fishing lure as claimed in claim 11 wherein said connector is an eyelet connected to said main body at said fourth connection site.

13. A fishing lure as claimed in claim 1 further comprising:
   at said third connection site, a connector for connecting a fishing line to said main body, said third connection site being located at the top center of said first flute, and
   a connector for connecting a hook to said main body at a fourth connection site, said fourth connection site being located at the bottom center of said second flute.

14. A fishing lure as claimed in claim 13 wherein said connectors are eyelets connected to said main body at said third and fourth connection sites.

15. A fishing lure as claimed in claim 1, wherein at least one of said flutes has a generally arcuate or concave "S" or reverse "S" shape.

16. A fishing lure as claimed in claim 1 wherein each end of said flutes is flattened so as to facilitate the attachment of said flutes to each other at their respective first and second ends.

* * * * *